(12) United States Patent
Cordery

(10) Patent No.: US 10,288,755 B2
(45) Date of Patent: May 14, 2019

(54) SEISMIC PROCESSING WORKFLOW FOR BROADBAND SINGLE-SENSOR SINGLE-SOURCE LAND SEISMIC DATA

(71) Applicant: Saudi Arabian Oil Company, Dhahran (SA)

(72) Inventor: Simon Cordery, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 18 days.

(21) Appl. No.: 15/471,690

(22) Filed: Mar. 28, 2017

(65) Prior Publication Data

US 2018/0284307 A1 Oct. 4, 2018

(51) Int. Cl.
*G01V 1/36* (2006.01)
*G01V 1/30* (2006.01)

(52) U.S. Cl.
CPC ............ *G01V 1/368* (2013.01); *G01V 1/30* (2013.01); *G01V 1/301* (2013.01); *G01V 1/362* (2013.01); *G01V 2210/22* (2013.01); *G01V 2210/324* (2013.01); *G01V 2210/53* (2013.01); *G01V 2210/584* (2013.01); *G01V 2210/6222* (2013.01)

(58) Field of Classification Search
CPC ........ G01V 1/368; G01V 1/364; G01V 1/303; G01V 1/30; G01V 2210/324
USPC ......... 702/14, 16, 17, 18; 367/38, 46, 43, 73
See application file for complete search history.

(56) References Cited

U.S. PATENT DOCUMENTS

| | | | |
|---|---|---|---|
| 5,400,299 A | 3/1995 | Trantham | |
| 5,479,376 A | 12/1995 | Gonzalez et al. | |
| 5,550,786 A | 8/1996 | Allen | |
| 5,555,218 A | 9/1996 | Chambers et al. | |
| 5,671,136 A * | 9/1997 | Willhoit, Jr. ............ | G01V 1/30 702/18 |
| 6,738,715 B2 | 5/2004 | Shatilo et al. | |
| 8,909,480 B2 | 12/2014 | Wei et al. | |
| 9,075,163 B2 | 7/2015 | Robertsson | |
| 2006/0158962 A1 | 7/2006 | Jeffryes | |
| 2007/0064530 A1 * | 3/2007 | Moore ................... | G01V 1/364 367/38 |
| 2010/0211319 A1 | 8/2010 | Manen et al. | |

(Continued)

FOREIGN PATENT DOCUMENTS

| | | |
|---|---|---|
| EP | 0 911648 | 4/1999 |
| EP | 2075597 | 7/2009 |

OTHER PUBLICATIONS

International Search Report and Written Opinion issued in International Application No. PCT/US2017/035890 dated Dec. 13, 2017; 14 pages.

*Primary Examiner* — John H Le
(74) *Attorney, Agent, or Firm* — Fish & Richardson P.C.

(57) ABSTRACT

A method for processing broadband single-sensor single-source land seismic data includes receiving seismic traces, the seismic traces generated using at least one source and at least one receiver; converting the seismic traces from particle motion measured by the at least one receiver to particle motion represented by the at least one source by applying a deterministic differential filtering operation; applying a deterministic inverse-Q filtering operation on the converted seismic traces; processing the inverse-Q filtered seismic traces using a set of surface-consistent filter and attribute corrections; and generating a seismic image based on the processed seismic traces.

15 Claims, 8 Drawing Sheets

(56) References Cited

U.S. PATENT DOCUMENTS

2012/0113747 A1    5/2012  Ferber
2015/0117149 A1    4/2015  Edme et al.
2015/0198728 A1    7/2015  Ollivrin
2016/0109592 A1*   4/2016  Sun ........................ G01V 1/303
                                                    367/46

* cited by examiner

300d

300e

300f

SEISMIC PROCESSING WORKFLOW FOR BROADBAND SINGLE-SENSOR SINGLE-SOURCE LAND SEISMIC DATA

TECHNICAL FIELD

This disclosure relates to seismic data processing.

BACKGROUND

Seismic data can be collected for a target region including one or more subsurface layers by sending seismic waves to the target region at multiple source locations and recording reflected waves at multiple receiver locations. The seismic data can be used to build seismic images for analyzing subsurface structure, stratigraphy and pore fill of the target region.

SUMMARY

The present disclosure describes methods and systems, including computer-implemented methods, computer program products, and computer systems of a seismic processing workflow for broadband single-sensor single-source land seismic data.

In some implementations, seismic traces are received, the seismic traces generated using at least one source and at least one receiver. The seismic traces are converted from particle motion measured by the at least one receiver to particle motion represented by the at least one source by applying a deterministic differential filtering operation. A deterministic inverse-Q filtering operation is applied on the converted seismic traces. The inverse-Q filtered seismic traces are processed using a set of surface-consistent filter and attribute corrections. A seismic image is generated based on the processed seismic traces.

The previously-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this disclosure can improve recovery of both low frequency and high frequency signals generated by seismic sources, providing deconvolved signal amplitude and phase spectra that is an improvement over traditional seismic processing workflows. The described approach can process seismic traces with an enhanced temporal resolution, enabling an improved structural interpretation. The described approach can boost low frequency signals of broadband single-sensor single-source land seismic data recorded by accelerometers, enabling amplitude inversion and quantitative interpretation. The described approach includes an iterated statistical derivation of a set of surface-consistent filters and attributes, whereby statistically derived deconvolution filters are reduced to a more residual process. The described approach can, in some implementations, provide a pragmatic seismic processing sequence using existing modules without substantially increasing processing effort and resources and without incorporating new modules. Other advantages will be apparent to those of ordinary skill in the art.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
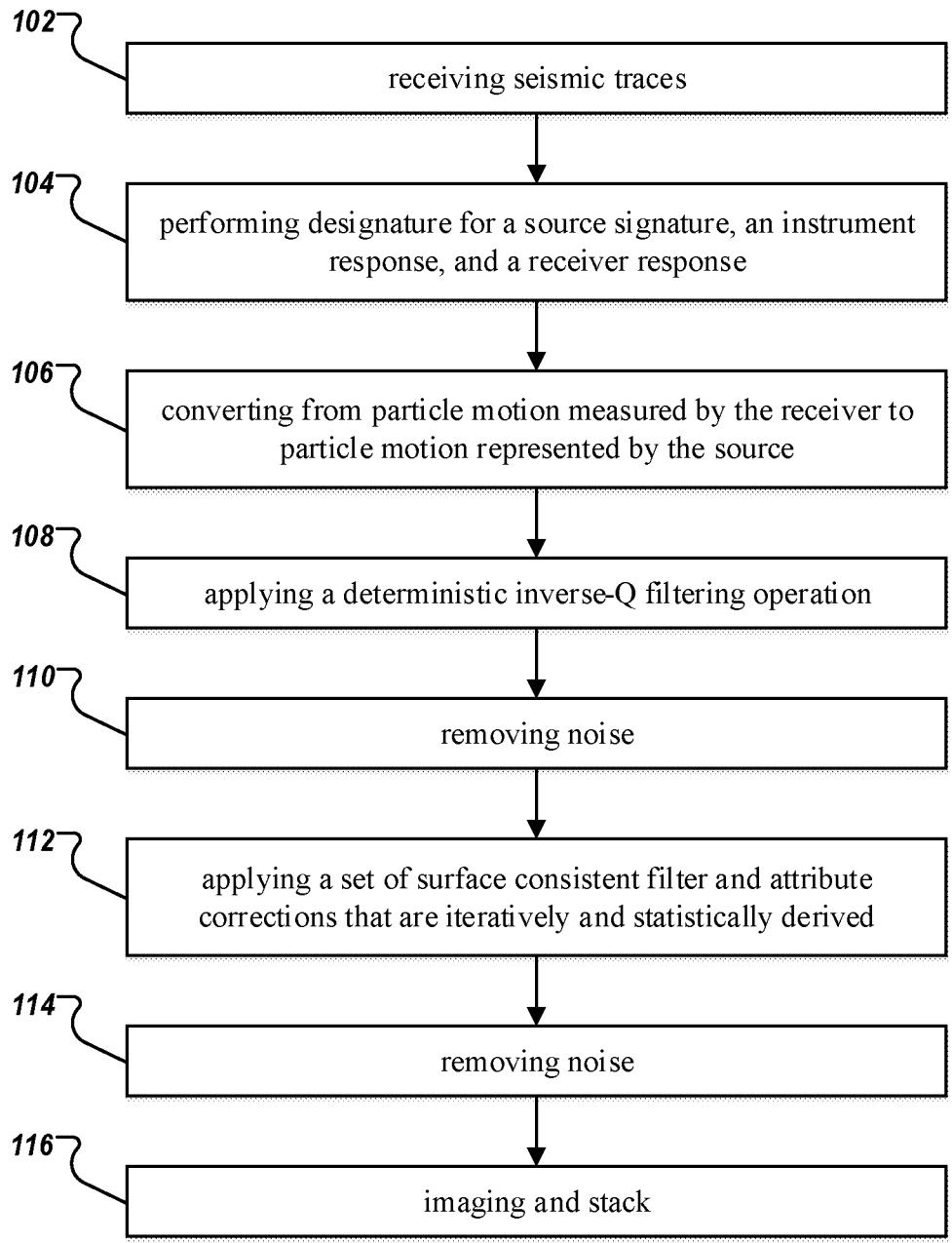
FIG. 1 is a flowchart of an example method for processing broadband single-sensor single-source land seismic data, according to some implementations.

The following detailed description describes a seismic processing workflow for broadband single-sensor single-source land seismic data and is presented to enable any person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications without departing from the scope of the disclosure. Thus, the present disclosure is not intended to be limited to the described or illustrated implementations, but is to be accorded the widest scope consistent with the principles and features disclosed.

In some cases, a broadband single-sensor single-source acquisition system, for example, a broadband single-sensor single-source vibrator acquisition system, can be used to acquire land seismic data. The single-sensor single-source acquisition system uses a broadband source wavelet of a sweeping frequency range to enable a high temporal resolution image of the subsurface layers to be made. For example, the broadband wavelet can have a sweeping frequency range from 2 Hertz (Hz) to 70 Hz, compared to conventional sweeps that would start from 7 Hz for example. Unlike conventional acquisition systems where each source station has an array of sources and each receiver station has an array of receivers, in a single-sensor single-source acquisition system each source station has a single source and each receiver station has a single receiver sensor so that signal smearing can be reduced. In some cases, the receiver sensor is an accelerometer, which can boost high frequency signal components. Existing processing workflows for broadband single-sensor single-source seismic land data usually fail to restore received signals to desired broadband zero-phase wavelets.

At a high level, the described approach restores received signals to broadband zero-phase wavelets by using a deterministic deconvolution step to correct for a receiver transfer function that includes a differential filter, followed by a deterministic inverse-Q filter that accounts for modelled earth absorption. The described approach also includes a statistical and iterative derivation of surface-consistent filters and attributes (including but not limited to Wiener deconvolution, residual statics and surface-consistent amplitude correction), whereby gather and stack reference traces are re-formed between iterations after application of previously iterated filters and attributes. Reference trace formation can include noise removal processes to mitigate undesired impact of noise. Note that in existing processing workflows, the step of statistical and iterative derivation is only for residual statics and typically after re-forming only the reference stack.

In some implementations, seismic traces are received, where the seismic traces are generated using at least one source and at least one receiver. The seismic traces can be converted from particle motion measured by the at least one receiver to particle motion represented by the at least one source by applying a deterministic differential filtering operation. A deterministic inverse-Q filtering operation can be applied on the converted seismic traces. The inverse-Q filtered seismic traces can be processed using a set of surface-consistent filter and attribute corrections. A seismic image can be generated based on the processed seismic traces. The seismic traces can be acquired by a broadband single-sensor single-source land seismic acquisition system. In some cases, the at least one receiver is an accelerometer, the particle motion measured by the at least one receiver is particle acceleration, the particle motion represented by the at least one source is particle displacement, and the deterministic differential filtering operation can use a filter of a −12 decibel/octave gain and a −180 degree phase shift. In some cases, the at least one receiver is a velocity sensor, the particle motion measured by the at least one receiver is particle velocity, the particle motion represented by the at least one source is particle displacement, and the deterministic differential filtering operation can use a filter of a −6 decibel/octave gain and a −90 degree phase shift. The inverse-Q filtering operation can be applied without a compromise for noise. The set of surface-consistent filter and attribute corrections can be iteratively and statistically derived, and include a deconvolution filter and attributes of velocity analysis, residual statics correction, and surface-consistent amplitude correction. In some implementations, a designature operation can be performed for a source signature, an instrument response, and a receiver response before converting the seismic traces from the particle motion measured by the at least one receiver to the particle motion represented by the at least one source. A noise removal process can be applied after converting the seismic traces from the particle motion measured by the at least one receiver to the particle motion represented by the at least one source. Another noise removal process can be applied after processing the seismic traces using the set of surface-consistent filter and attribute corrections.

FIG. 1 is a flowchart of an example method 100 for processing broadband single-sensor single-source land seismic data, according to some implementations. For clarity of presentation, the description that follows generally describes method 100 in the context of the other figures in this disclosure. For example, method 100 can be performed by a computer system described in FIG. 6. However, method 100 may be performed, for example, by any suitable system, environment, software, and hardware, or a combination of systems, environments, software, and hardware as appropriate. In some implementations, various steps of method 100 can be run in parallel, in combination, in loops, or in any order.

The method 100 starts at block 102 where seismic traces of a target region are received from a broadband single-sensor single-source acquisition system. The target region can include one or more earth subsurface layers. A seismic source can send seismic waves into the target region, and a number of sensor receivers positioned on or below the earth surface can measure and record one or more aspects of waves reflected by the target region. For example, when a wavefield propagates through subsurface layers, the wavefield causes rock or fluid particles in the subsurface layers to move. The sensor receiver can record particle motion or ground motion at the receiver location. In a broadband single-sensor single-source acquisition system, the source wave sent by the seismic source can be a broadband wavelet having a sweeping frequency range and accelerometers can be used to measure and record accelerations of particle motions. In some cases, the seismic source can generate seismic shots at different locations for the receivers to record reflected waves. The recorded data at each receiver corresponding to a single shot is called a trace, and each trace can be a function of time. For instance, if the seismic source fired shots at 100,000 different locations and there are 1,000 receivers, the resultant seismic data can have $10^8$ traces.

A vibrator source wavelet (for example a VIBROSEIS source wavelet) is a ground force signal that has a flat spectrum across the sweeping frequency range, and a far-field particle displacement that is proportional to the ground force according to theory. In some implementations, final processed traces can represent the far-field particle displacement created by the source wavelet. In other words, the final processed traces can be displacement wavelets with a flat wavelet spectrum.

At block 104, a designature operation is performed on the received seismic traces to correct for a source signature, a recording instrument response, and a receiver response. For example, each received trace can deconvolve with the source wavelet, the recording instrument impulse response, and the receiver impulse response. The designature need only deconvolve the amplitude spectra if the phase spectra are removed by sweep correlation.

Figure 2A:
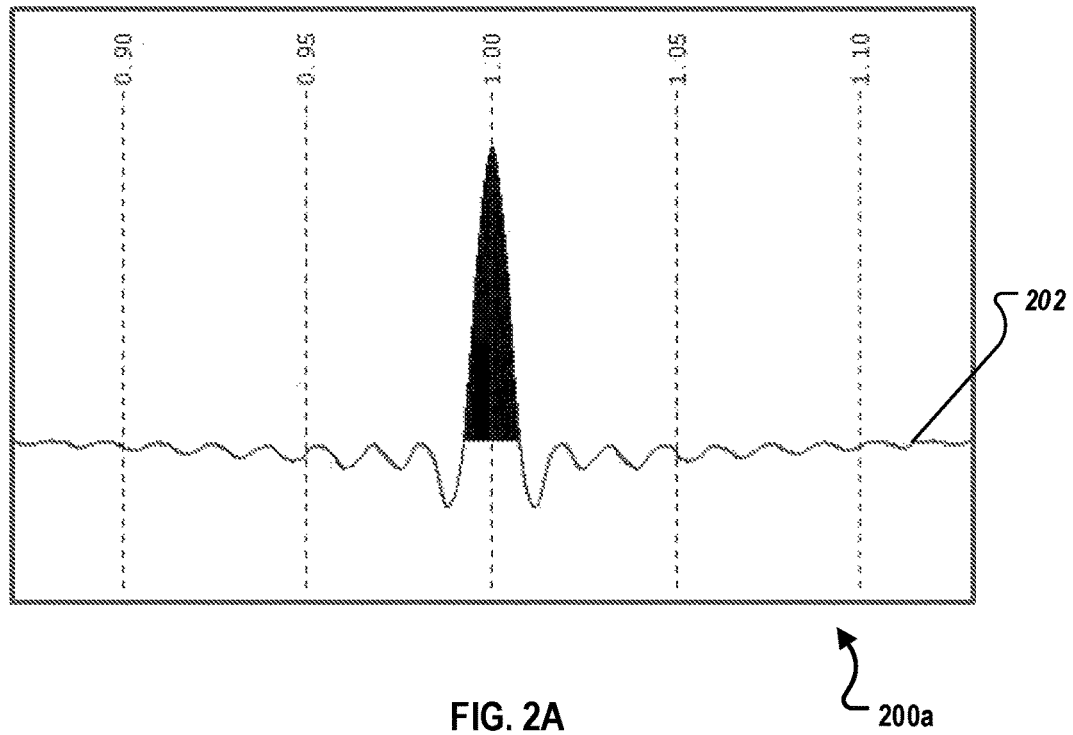
FIGS. 2A-2D illustrate seismic traces before and after a designature operation, according to some implementations.
Figure 2B:
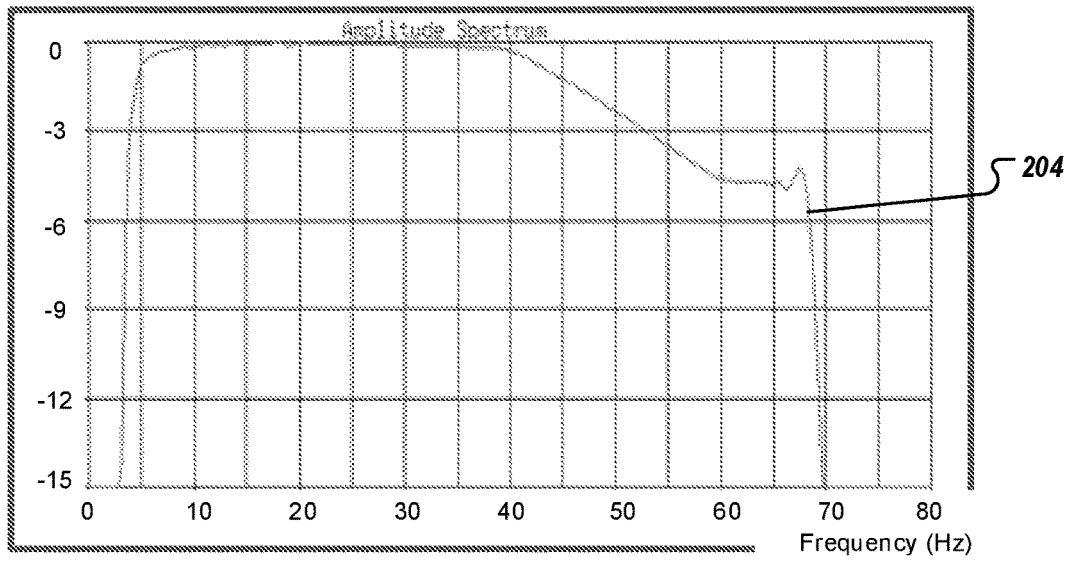
Figure 2C:
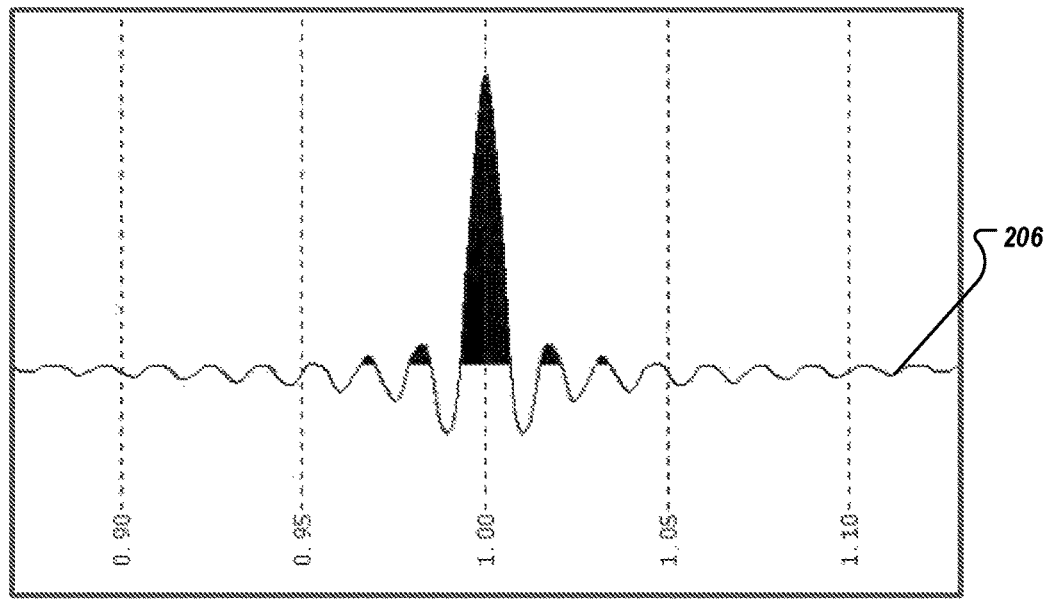
Figure 2D:
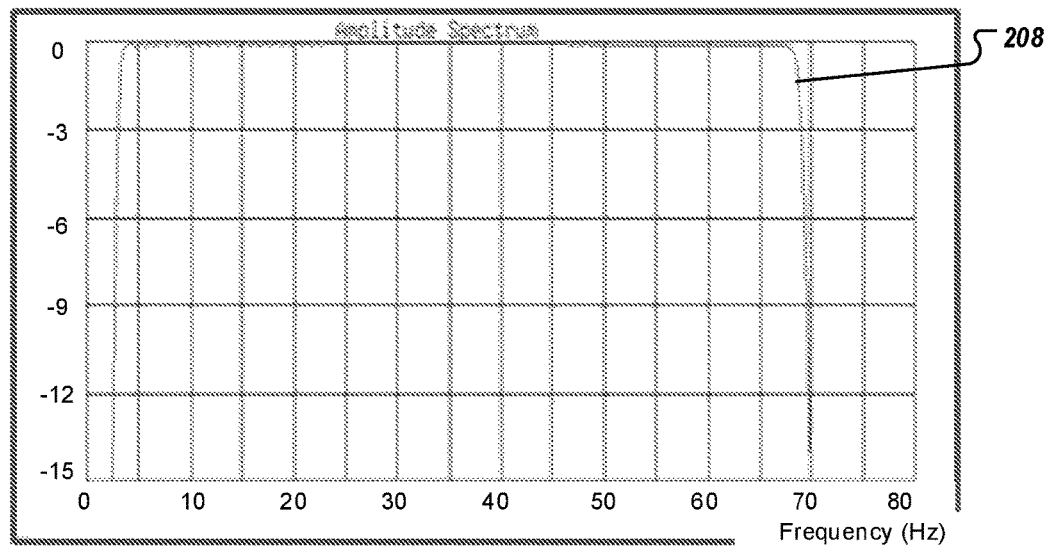

FIGS. 2A-2D illustrate seismic traces before and after a designature operation, according to some implementations. In FIGS. 2A and 2C, the horizontal and vertical axis represent a time and an amplitude, respectively. In FIGS. 2B and 2D, the horizontal and vertical axis represent a frequency and an amplitude, respectively. FIGS. 2A-2B illustrate a trace before the designature operation in a time domain and a frequency domain, respectively. FIG. 2A shows a Klauder wavelet 202, which is a combined response of a source wavelet, a receiver response, and a recording instrument response, where the source wavelet has a sweeping frequency range of 3.5-68 Hz. The Klauder wavelet is in this example the autocorrelation of the source sweep convolved with the autocorrelation of the receiver impulse response convolved with the autocorrelation of the recording instrument impulse response. FIG. 2B shows the amplitude spectrum 204 of the Klauder wavelet 202. FIGS. 2C-2D illustrate a trace after the designature operation in a time domain and a frequency domain, respectively. FIG. 2C illustrates the resultant wavelet 206 after performing the designature process on the Klauder wavelet 202. FIG. 2D shows the amplitude spectrum 208 of the wavelet 206.

At block 106, the seismic traces from block 104 are transferred from the particle motion measured by the receiver to the far-field particle motion represented by the source. In some implementations, the seismic traces from block 104 are converted from particle acceleration to particle displacement by applying a deterministic differential filtering operation. For example, for a vibrator source recorded by accelerometers, where the source far-field particle displacement is proportional to the vibrator ground force and the accelerometer receivers measure particle acceleration, the traces can be transferred from particle acceleration to particle displacement by deconvolving the traces with a differential filter having a frequency response of a −12 decibel/octave (dB/Oct) gain and a −180 degree phase shift. In some implementations, if the receivers are velocity sensors, the seismic traces from block 104 can be converted from particle velocity to particle displacement by deconvolving the traces with a differential filter having a frequency response of a −6 decibel/octave (dB/Oct) gain and a −90 degree phase shift.

Figures 3A, 3B, 3C:
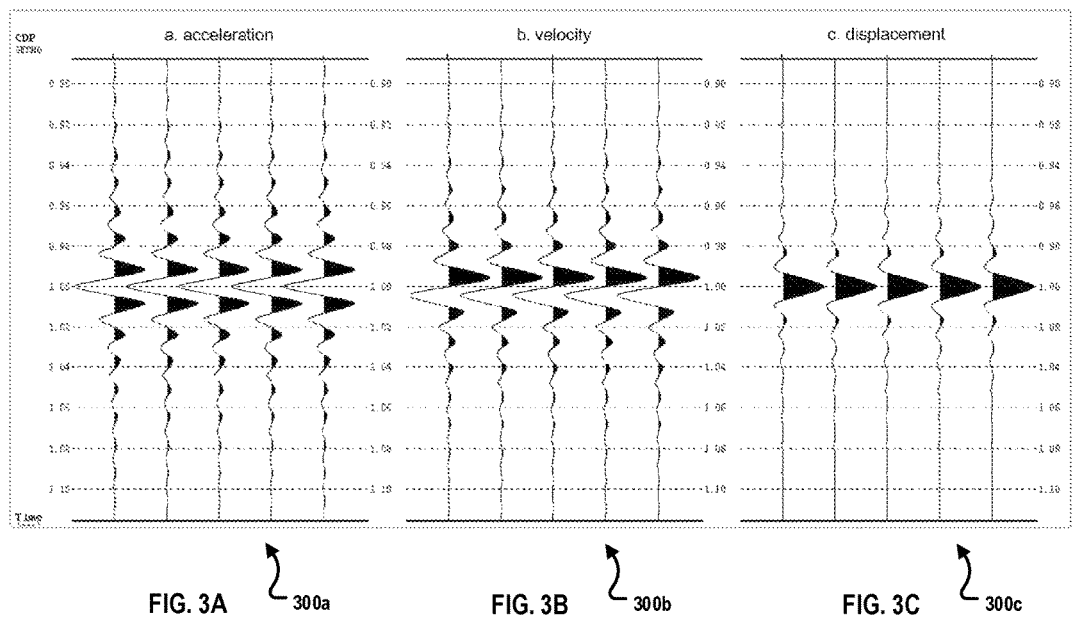
FIGS. 3A-3F illustrate converting seismic traces from particle acceleration to particle displacement, according to some implementations.
Figure 3D:
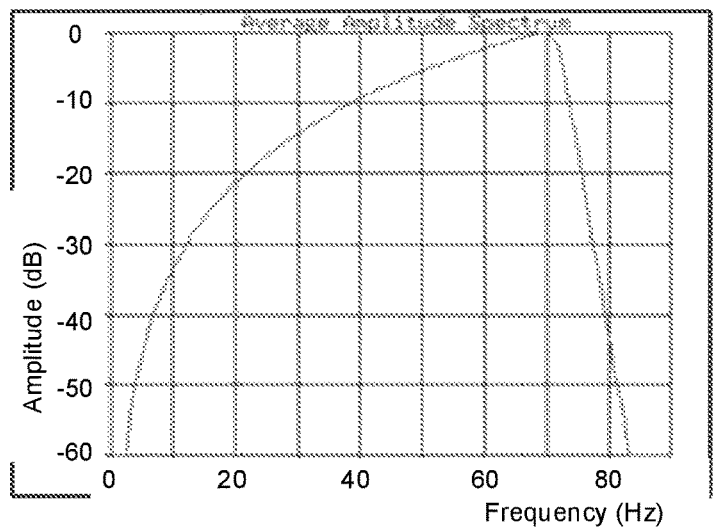
Figure 3E:
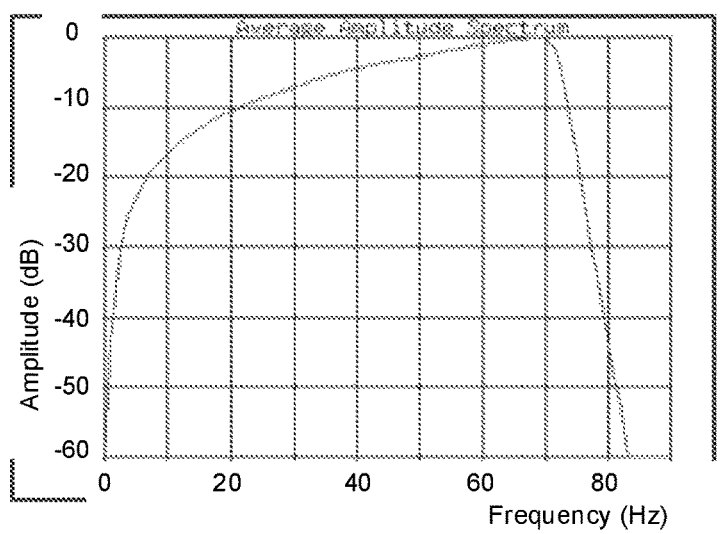
Figure 3F:
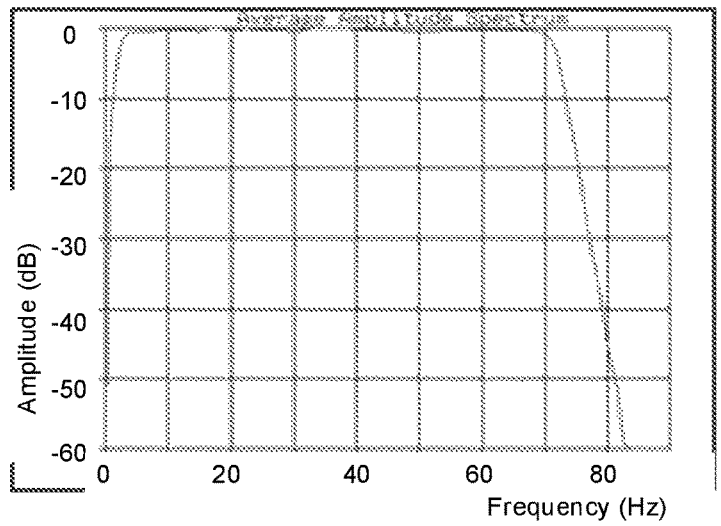

FIGS. 3A-3F illustrate converting seismic traces from particle acceleration to particle displacement, according to some implementations. FIGS. 3A-3C illustrate particle acceleration, velocity, and displacement traces in a time domain, respectively. In FIGS. 3A-3C, the horizontal and vertical axis represent a trace index and a time, respectively. FIGS. 3D-3F illustrate amplitude frequency responses of the acceleration, velocity, and displacement traces in FIGS. 3A-3C, respectively. In FIGS. 3D-3F, the horizontal and vertical axis represent a frequency and an amplitude, respectively. For example, FIG. 3A shows five traces of particle acceleration, where each trace is a simulated flat displacement sweep (a band limited spike) filtered with an emulated transfer filter for an acceleration sensor receiver. The velocity traces in FIG. 3B can be obtained by performing a time integration operation (for example, deconvolving with a differential filter having a frequency response of a −6 dB/Oct gain and a −90 degree phase shift) on the acceleration traces in FIG. 3A, and the displacement traces in FIG. 3C can be obtained by performing a time integration operation on the velocity traces in FIG. 3B. FIG. 3F shows that the displacement traces have a flat amplitude spectrum across the sweeping frequency range.

At block 108, a deterministic inverse-Q filtering operation is applied on the traces from block 106. In some implementations, a deterministic inverse-Q filter is applied to correct for earth absorption and scattering using modelled Q-values and large gain limits without the traditional concern for noise boosting. This is done by setting the amplitude boost limit to the boost level for the maximum sweep frequency at the deepest desired target. Consequently the boost limit is many decibels larger than would otherwise have been used in traditional applications of inverse-Q filtering. In the described processing workflow, the step of inverse-Q filtering is performed at an early stage in the workflow, that is, after the traces being transferred from acceleration to displacement but before noise removal and applying surface-consistent filters and attributes. Compared to traditional processing workflows, blocks 104-108 produce improved deterministically deconvolved seismic traces that are representative of both the desired signal and relative levels of noise across the frequencies in the source sweeping range, providing more useful quality-control products through the seismic processing flow.

Figure 4A:
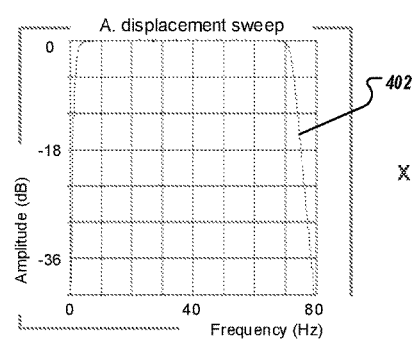
FIGS. 4A-4D illustrate operations of converting from particle acceleration to particle displacement and inverse-Q filtering, according to some implementations.
Figure 4B:
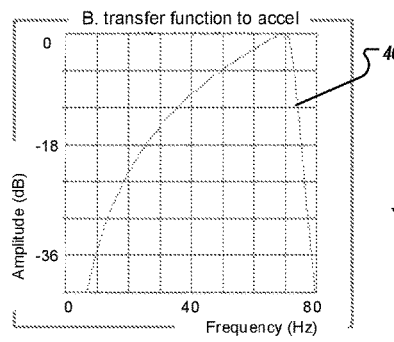
Figure 4C:
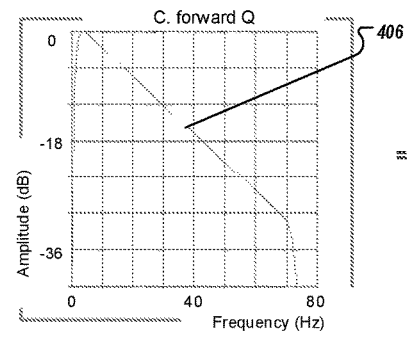
Figure 4D:
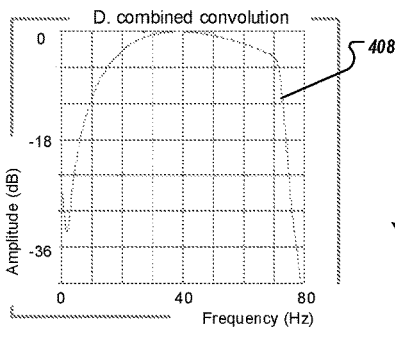

FIGS. 4A-4D illustrate operations of converting from particle acceleration to particle displacement and inverse-Q filtering, according to some implementations. FIG. 4A illustrates an amplitude frequency response of a displacement sweep 402. FIG. 4B illustrates an amplitude frequency response of an accelerometer transfer function 404 that converts displacement to acceleration. FIG. 4C illustrates an amplitude frequency response of a forward-Q filter 406 that models earth absorption for Q=60 at a two-way travel time of 1,000 millisecond (ms) (that is, the time for the signal to travel from the source to the subsurface reflector, and to the receiver. FIG. 4D illustrates a combined amplitude frequency response 408 by multiplying the frequency responses 402, 404, and 406. In other words, the combined frequency response 408 can represent the recorded traces at the accelerometer. The processing of block 106 removes the accelerometer transfer function 404, and the processing of block 108 removes the earth absorption forward-Q filter 406. The net effect of blocks 106 and 108 is to filter the combined frequency response 408 back to the displacement sweep 402.

At block 110, a noise removal process is applied to the traces from block 108. For example, the noise removal process can be a frequency-wavenumber (f-k) filtering operation or other operations. The noise removal process of block 110 can include removal of coherent, aliased and scattered linear noise, removal (deblending) of simultaneous sources, suppression of noise bursts, suppression of vibrator airblast noise, and removal or suppression of other types of noise.

At block 112, a set of surface-consistent filter and attribute corrections that are iteratively and statistically derived are applied to the traces from block 110. As will be discussed later in FIG. 5, the set of surface-consistent filter and attribute corrections (for example, deconvolution filters, residual statics correction, and amplitudes correction) can be derived, simultaneously or separately, in an iterative manner, whereby all gather and stack reference traces are re-formed between iterations after application of previously iterated filters and attributes. Formation of reference traces can include noise removal processes to enable a derivation of filters and attributes free of undesired impact of noise.

In traditional processing flows, the statistical deconvolution filter derivation is purposely tempered by an addition of white noise to prevent low-amplitude frequencies being overly boosted, with the assumption that the low-amplitude frequencies are noise or unusable signal energy. Broadband accelerometer data is characterized by low-amplitude low-frequency signals (for example, 5 Hz signal is 30 dB down as seen in FIG. 4B), including the low frequencies purposely included in the broadband sweep and of particular interest (as can be seen in FIG. 4B), and the traditional processing flows prevent correct statistical deconvolution of this low-amplitude low-frequency signal. The deterministic deconvolution at block 106 restores the low-amplitude low-frequency signals and the inverse-Q filtering at block 108 balances the high-frequency signals, enabling a better statistical deconvolution across the signal frequency band. As a result, the statistical deconvolution processing included at block 112 becomes a residual process for deconvolution filtering.

At block 114, a noise removal process is applied to the traces from block 112. The noise removal process of block 114 can include removal of coherent linear noise, suppression of random noise, suppression of noise bursts, and removal or suppression of other types of noise.

At block 116, the traces from block 114 are stacked and processed to generate seismic images.

Figure 5:
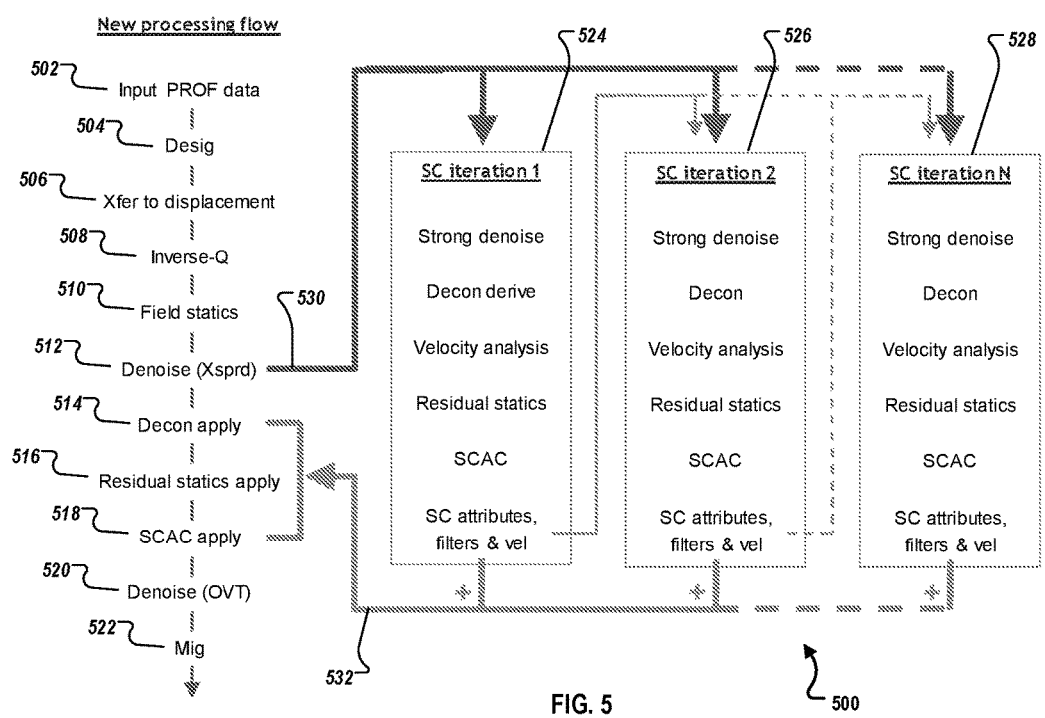
FIG. 5 illustrates a processing flow for broadband single-sensor single-source land seismic data, according to some implementations.

FIG. 5 illustrates a processing flow 500 for broadband single-sensor single-source land seismic data, according to some implementations. The processing flow 500 includes processing steps of blocks 102-116 in FIG. 1. For clarity of presentation, the description that follows generally describes processing flow 500 in the context of the other figures in this disclosure. For example, processing flow 500 can be performed by a computer system described in FIG. 6. However, processing flow 500 may be performed, for example, by any suitable system, environment, software, and hardware, or a combination of systems, environments, software, and hardware as appropriate. In some implementations, various steps of processing flow 500 can be run in parallel, in combination, in loops, or in any order.

At step 502, recorded acceleration seismic traces are received. At step 504, a designature operation as described in block 104 is performed. At step 506, the acceleration traces are converted to displacement traces as described in block 106. At step 508, an inverse-Q filter for earth absorption is applied as described in block 108. At step 510, field statics corrections are performed. At step 512, denoise is applied as described in block 110.

At steps 514-518, processing steps of deconvolution, residual statics correction, and surface-consistent (SC) amplitude correction (SCAC) are applied as described in block 112. A set of filters and attributes related to processing steps of denoise, deconvolution, velocity analysis, residual statics correction, and SCAC are derived iteratively as illustrated in steps 524-528. For example, the set of filters and attributes (or each filter or attribute) can be represented by an operator F and iteratively derived by $F^{(i)}=F^{(i-1)}\Delta F^{(i)}$, where $F^{(i)}$ represents the set of filters and attributes at the ith iteration, and $\Delta F^{(i)}$ represents updates derived at the ith iteration. Each iteration is run on a set of reference traces that are formed from the denoised data 530 (that is, the output of the denoise step 512) with previously iterated filters and attributes applied and, if needed, with a subsequent application of further noise removal to give reference traces with minimal levels of noise.

For instance, at the first iteration step 524, the denoised data 530 can be used to generate an initial set of reference traces $RT^{(1)}$, which are used to derive an initial set of filters and attributes $F^{(1)}$. At the second iteration step 526, the set of filters and attributes $F^{(1)}$ are applied to the denoised data 530 prior to generating a second set of reference traces $RT^{(2)}$. The reference traces $RT^{(2)}$ are used to derive updates $\Delta F^{(2)}$ and generate $F^{(2)}=F^{(1)}\Delta F^{(2)}$, and so on. After the Nth iteration step 528, the set of filters and attributes $F^{(1)}$ to $F^{(N)}$ are applied to the output of the denoise step 512 by steps 514, 516 and 518 to generate a final set of processed traces 518 that are input to step 520.

At step 520, denoise is applied as described in block 114. At step 522, processing steps such as migration (or imaging) and stacking can be performed as described in block 116.

Figure 6:
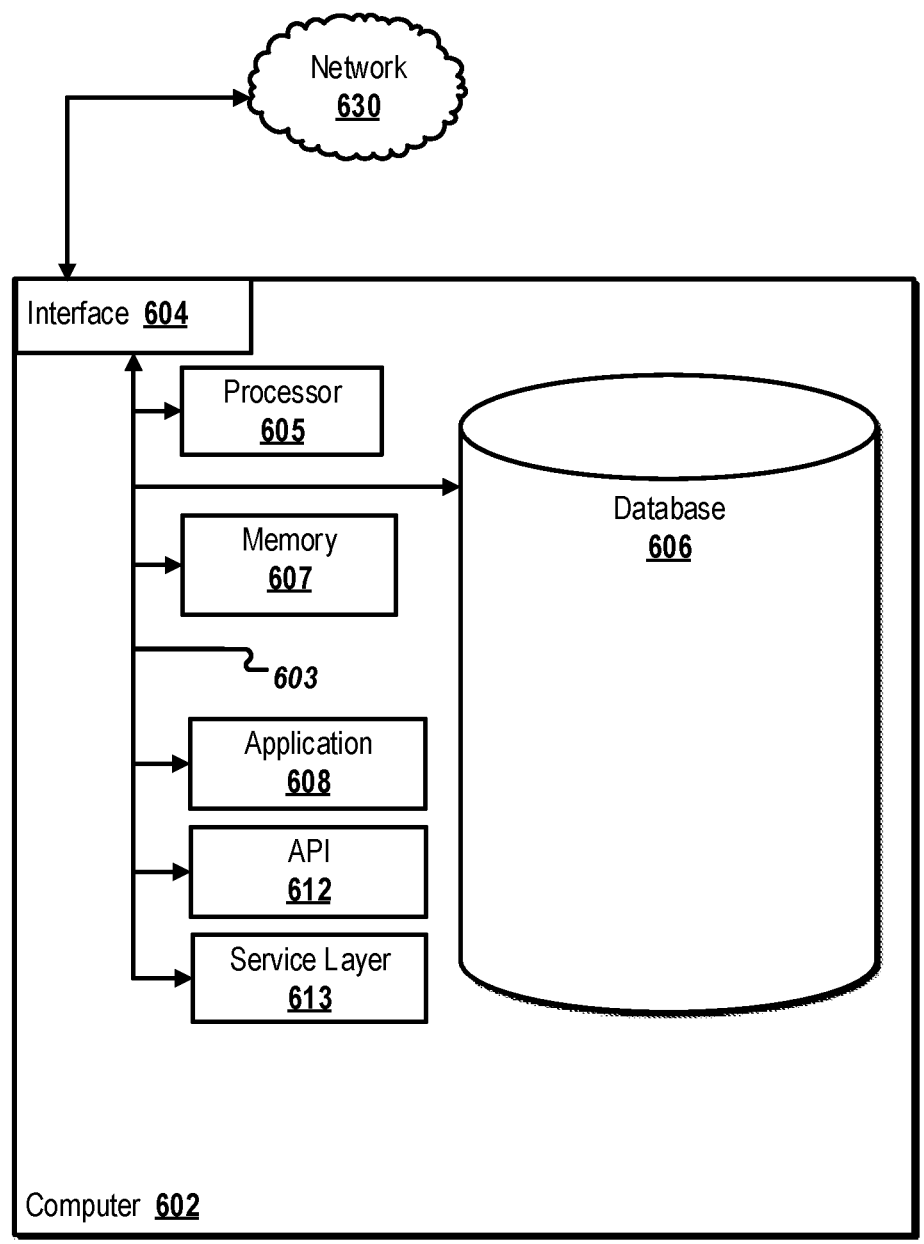
FIG. 6 is a block diagram illustrating an example computer system used to provide computational functionalities associated with described algorithms, methods, functions, processes, flows, and procedures as described in the instant disclosure, according to some implementations.

FIG. 6 is a block diagram of an example computer system 600 used to provide computational functionalities associated with described algorithms, methods, functions, processes, flows, and procedures as described in the instant disclosure, according to some implementations. The illustrated computer 602 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 602 may comprise a computer that includes an input device, such as a keypad, keyboard, touch screen, or other device that can accept user information, and an output device that conveys information associated with the operation of the computer 602, including digital data, visual, or audio information (or a combination of information), or a graphical user interface (GUI).

The computer 602 can serve in a role as a client, network component, a server, a database or other persistency, or any other component (or a combination of roles) of a computer system for performing the subject matter described in the instant disclosure. The illustrated computer 602 is communicably coupled with a network 630. In some implementations, one or more components of the computer 602 may be configured to operate within environments, including cloud-computing-based, local, global, or other environment (or a combination of environments).

At a high level, the computer 602 is an electronic computing device operable to receive, transmit, process, store, or manage data and information associated with the described subject matter. According to some implementations, the computer 602 may also include or be communicably coupled with an application server, e-mail server, web server, caching server, streaming data server, or other server (or a combination of servers).

The computer 602 can receive requests over network 630 from a client application (for example, executing on another computer 602) and responding to the received requests by processing the received requests using an appropriate software application(s). In addition, requests may also be sent to the computer 602 from internal users (for example, from a command console or by other appropriate access method), external or third-parties, other automated applications, as well as any other appropriate entities, individuals, systems, or computers.

Each of the components of the computer 602 can communicate using a system bus 603. In some implementations, any or all of the components of the computer 602, both hardware or software (or a combination of hardware and software), may interface with each other or the interface 604 (or a combination of both) over the system bus 603 using an application programming interface (API) 612 or a service layer 613 (or a combination of the API 612 and service layer 613). The API 612 may include specifications for routines, data structures, and object classes. The API 612 may be either computer-language independent or dependent and refer to a complete interface, a single function, or even a set of APIs. The service layer 613 provides software services to the computer 602 or other components (whether or not illustrated) that are communicably coupled to the computer 602. The functionality of the computer 602 may be accessible for all service consumers using this service layer. Software services, such as those provided by the service layer 613, provide reusable, defined functionalities through a defined interface. For example, the interface may be software written in JAVA, C++, or other suitable language providing data in extensible markup language (XML) format or other suitable format. While illustrated as an integrated component of the computer 602, alternative implementations may illustrate the API 612 or the service layer 613 as stand-alone components in relation to other components of the computer 602 or other components (whether or not illustrated) that are communicably coupled to the computer 602. Moreover, any or all parts of the API 612 or the service layer 613 may be implemented as child or sub-modules of another software module, enterprise application, or hardware module without departing from the scope of this disclosure.

The computer 602 includes an interface 604. Although illustrated as a single interface 604 in FIG. 6, two or more interfaces 604 may be used according to particular needs, desires, or particular implementations of the computer 602. The interface 604 is used by the computer 602 for communicating with other systems that are connected to the network 630 (whether illustrated or not) in a distributed environment. Generally, the interface 604 comprises logic encoded in software or hardware (or a combination of software and hardware) and is operable to communicate with the network 630. More specifically, the interface 604 may comprise software supporting one or more communication protocols associated with communications such that the network 630 or interface's hardware is operable to communicate physical signals within and outside of the illustrated computer 602.

The computer 602 includes a processor 605. Although illustrated as a single processor 605 in FIG. 6, two or more processors may be used according to particular needs, desires, or particular implementations of the computer 602. Generally, the processor 605 executes instructions and manipulates data to perform the operations of the computer 602 and any algorithms, methods, functions, processes, flows, and procedures as described in the instant disclosure.

The computer 602 also includes a database 606 that can hold data for the computer 602 or other components (or a combination of both) that can be connected to the network 630 (whether illustrated or not). For example, database 606 can be an in-memory, conventional, or other type of database storing data consistent with this disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases (of the same or combination of types) can be used according to particular needs, desires, or particular implementations of the computer 602 and the described functionality. While database 606 is illustrated as an integral component of the computer 602, in alternative implementations, database 606 can be external to the computer 602. For example, the database 606 can hold seismic data.

The computer 602 also includes a memory 607 that can hold data for the computer 602 or other components (or a combination of both) that can be connected to the network 630 (whether illustrated or not). For example, memory 607 can be random access memory (RAM), read-only memory (ROM), optical, magnetic, and the like storing data consistent with this disclosure. In some implementations, memory 607 can be a combination of two or more different types of memory (for example, a combination of RAM and magnetic storage) according to particular needs, desires, or particular implementations of the computer 602 and the described functionality. Although illustrated as a single memory 607 in FIG. 6, two or more memories 607 (of the same or combination of types) can be used according to particular needs, desires, or particular implementations of the computer 602 and the described functionality. While memory 607 is illustrated as an integral component of the computer 602, in alternative implementations, memory 607 can be external to the computer 602.

The application 608 is an algorithmic software engine providing functionality according to particular needs, desires, or particular implementations of the computer 602, particularly with respect to functionality described in this disclosure. For example, application 608 can serve as one or more components, modules, or applications. Further, although illustrated as a single application 608, the application 608 may be implemented as multiple applications 608 on the computer 602. In addition, although illustrated as integral to the computer 602, in alternative implementations, the application 608 can be external to the computer 602.

There may be any number of computers 602 associated with, or external to, a computer system containing computer 602, each computer 602 communicating over network 630. Further, the term "client," "user," and other appropriate terminology may be used interchangeably as appropriate without departing from the scope of this disclosure. Moreover, this disclosure contemplates that many users may use one computer 602, or that one user may use multiple computers 602.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/–R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously-described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously-described implementations should not be understood as requiring such separation or integration in all implementations, and it should be understood that the described program components and systems can generally be integrated together in a single software product or packaged into multiple software products.

Accordingly, the previously-described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

The invention claimed is:

1. A method, comprising:
   receiving seismic traces, the seismic traces generated using at least one source and at least one receiver, wherein the at least one receiver is an accelerometer;
   converting the seismic traces from particle motion measured by the at least one receiver to particle motion represented by the at least one source by applying a deterministic differential filtering operation, wherein the particle motion measured by the at least one receiver is particle acceleration, the particle motion represented by the at least one source is particle displacement, and the deterministic differential filtering operation uses a filter of a $-12$ decibel/octave gain and a $-180$ degree phase shift;
   applying a deterministic inverse-Q filtering operation on the converted seismic traces;
   processing the inverse-Q filtered seismic traces using a set of surface-consistent filter and attribute corrections; and
   generating a seismic image based on the processed seismic traces.

2. The method of claim 1, wherein the seismic traces are acquired by a broadband single-sensor single-source land seismic acquisition system.

3. The method of claim 1, wherein the inverse-Q filtering operation is applied without a compromise for noise.

4. The method of claim 1, wherein the set of surface-consistent filter and attribute corrections are iteratively and statistically derived, and include a deconvolution filter and attributes of velocity analysis, residual statics correction, and surface-consistent amplitude correction.

5. The method of claim 1, further comprising performing designature for a source signature, an instrument response, and a receiver response before converting the seismic traces from the particle motion measured by the at least one receiver to the particle motion represented by the at least one source.

6. The method of claim 1, further comprising:
   removing noise after converting the seismic traces from the particle motion measured by the at least one receiver to the particle motion represented by the at least one source; and
   removing noise from the processed seismic traces that have had the set of surface-consistent filter and attribute corrections applied.

7. A system, comprising:
   a computer memory; and
   one or more hardware processor interoperably coupled with the computer memory and configured to perform operations comprising:
      receiving seismic traces, the seismic traces generated using at least one source and at least one receiver, wherein the at least one receiver is an accelerometer;
      converting the seismic traces from particle motion measured by the at least one receiver to particle motion represented by the at least one source by applying a deterministic differential filtering operation, wherein the particle motion measured by the at least one receiver is particle acceleration, the particle motion represented by the at least one source is particle displacement, and the deterministic differential filtering operation uses a filter of a −12 decibel/octave gain and a −180 degree phase shift;
applying a deterministic inverse-Q filtering operation on the converted seismic traces;
processing the inverse-Q filtered seismic traces using a set of surface-consistent filter and attribute corrections; and
generating a seismic image based on the processed seismic traces.

8. The system of claim 7, wherein the seismic traces are acquired by a broadband single-sensor single-source land seismic acquisition system.

9. The system of claim 7, wherein the set of surface-consistent filter and attribute corrections are iteratively and statistically derived, and include a deconvolution filter and attributes of velocity analysis, residual statics correction, and surface-consistent amplitude correction.

10. The system of claim 7, wherein the operations further comprise performing designature for a source signature, an instrument response, and a receiver response before converting the seismic traces from the particle motion measured by the at least one receiver to the particle motion represented by the at least one source.

11. The system of claim 7, wherein the operations further comprise:
removing noise after converting the seismic traces from the particle motion measured by the at least one receiver to the particle motion represented by the at least one source; and
removing noise from the processed seismic traces that have had the set of surface-consistent filter and attribute corrections applied.

12. A non-transitory, computer-readable medium storing one or more instructions executable by a computer system to perform operations comprising:
receiving seismic traces, the seismic traces generated using at least one source and at least one receiver, wherein the at least one receiver is an accelerometer;
converting the seismic traces from particle motion measured by the at least one receiver to particle motion represented by the at least one source by applying a deterministic differential filtering operation, wherein the particle motion measured by the at least one receiver is particle acceleration, the particle motion represented by the at least one source is particle displacement, and the deterministic differential filtering operation uses a filter of a −12 decibel/octave gain and a −180 degree phase shift;
applying a deterministic inverse-Q filtering operation on the converted seismic traces;
processing the inverse-Q filtered seismic traces using a set of surface-consistent filter and attribute corrections; and
generating a seismic image based on the processed seismic traces.

13. The non-transitory, computer-readable medium of claim 12, wherein the seismic traces are acquired by a broadband single-sensor single-source land seismic acquisition system.

14. The non-transitory, computer-readable medium of claim 12, wherein the set of surface-consistent filter and attribute corrections are iteratively and statistically derived, and include a deconvolution filter and attributes of velocity analysis, residual statics correction, and surface-consistent amplitude correction.

15. The non-transitory, computer-readable medium of claim 12, wherein the operations further comprise performing designature for a source signature, an instrument response, and a receiver response before converting the seismic traces from the particle motion measured by the at least one receiver to the particle motion represented by the at least one source.

* * * * *